Oct. 29, 1957  G. E. FRANCK  2,811,128
LIQUID INDICATOR FOR TUBING
Filed March 31, 1955
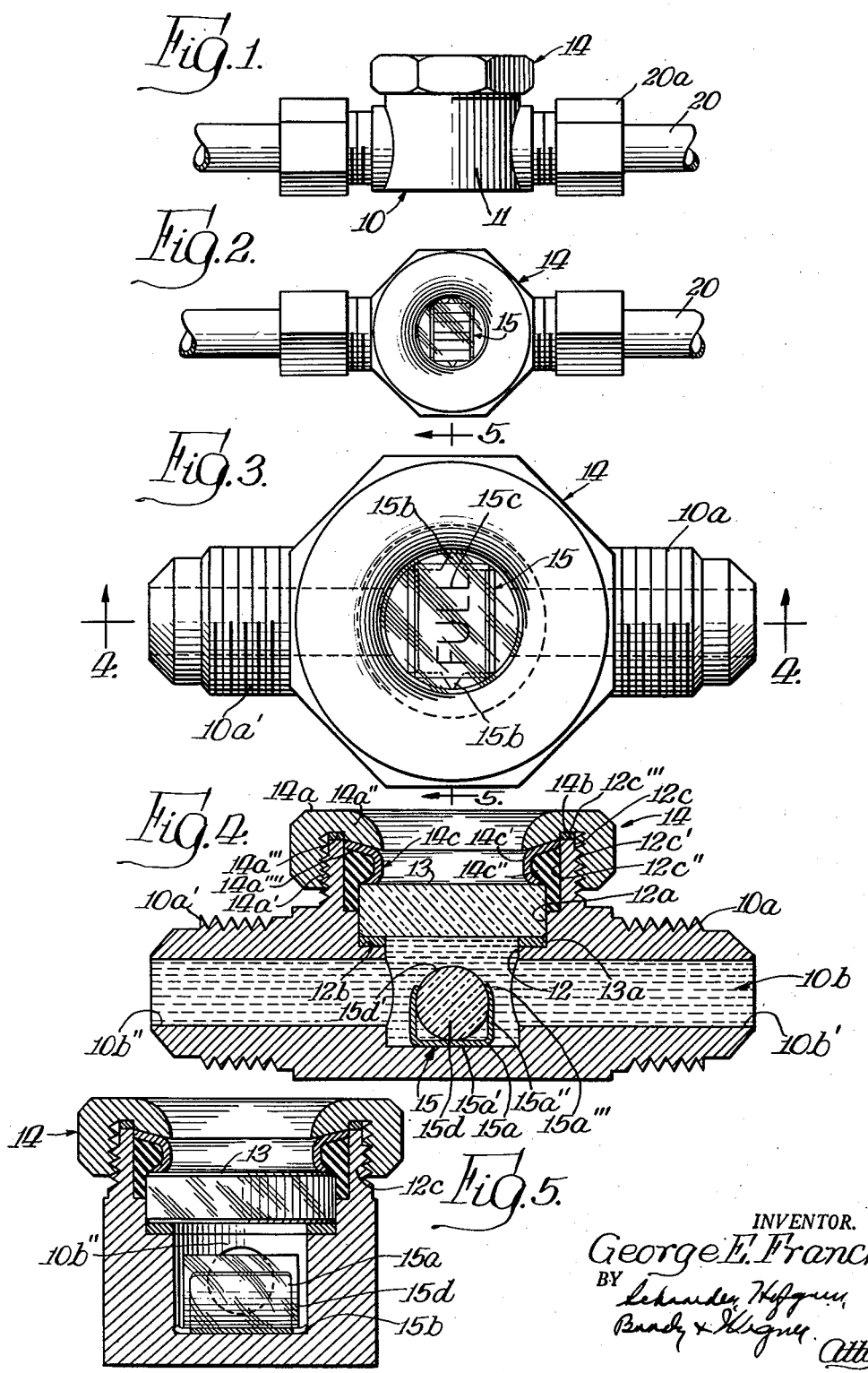
INVENTOR.
George E. Franck,
BY

United States Patent Office 2,811,128
Patented Oct. 29, 1957

2,811,128

LIQUID INDICATOR FOR TUBING

George E. Franck, Riverside, Ill., assignor to The Imperial Brass Manufacturing Company, a corporation of Illinois Application March 31, 1955, Serial No. 498,165

5 Claims. (Cl. 116—117)

This invention relates to a liquid indicator and in particular to a cylindrical indicator arranged for connection to liquid carrying tubing and which automatically indicates the presence of the liquid in the tubing.

Sundry forms of liquid indicators are known in the art. A common form of such indicator is that comprising a tubular body member having ends adapted for connection of tubing in fluid conductive relationship with the indicator and interiorly carrying a glass tube which is sealingly secured thereto and through which the liquid passes. By means of an aperture in the body member wall, the interior of the glass tube may be inspected for determining the presence of liquid therein. Two serious disadvantages, however, are found in this form of indicator, namely, susceptibility of the glass tubing to cracking when excessive compression pressure is applied thereon during installation of the indicator or by subsequent contraction of the body member, and the difficulty of ascertaining the presence of liquid when the liquid is transparent and colorless. As leakage from the indicator due to the cracking of the glass tube or a false determination as to the presence of liquid in the tubing may involve costly losses of the liquid or dangerous conditions, such disadvantages are highly undesirable.

It is therefore the principal object of my invention to provide a new and improved liquid indicator for connection in a tubing line.

Another object is to provide a new and improved cylindrical liquid indicator having a transparent window to allow viewing the interior thereof with such window being resiliently carried by the body member of the indicator to preclude the transmission of excessive stresses to the window member.

Still another object of the invention is to provide a new and improved liquid indicator having interiorly disposed indicating means arranged to have little effect on the flow of liquid through the indicator and which will automatically indicate the presence of liquid therein.

A still further object is to provide a liquid indicator of the character described above wherein the indicating means comprises printed matter and optical refracting means interposed between the printed matter and the window.

A yet further object is to provide such a liquid indicator wherein the refracting means comprises a transparent element having a non-planar surface directed toward the window and which is formed of material having a refractive index substantially similar to the refractive index of the liquid to be indicated.

Yet another object is to provide simple and effective means for carrying a legend and the refracting means which may be readily inserted into the interior of the indicator while being subsequently effectively secured therein against the dislodging tendencies of the liquid flow therethrough.

Other features and advantages of the invention will be apparent from the following description taken in connection with the accompanying drawings wherein:

Figure 1 is a side elevational view of a liquid indicator embodying the invention with portions of a tubing line secured thereto;

Figure 2 is a plan view of the device of Figure 1, and showing the indicating means image when the liquid to be indicated is not present in the line;

Figure 3 is an enlarged plan view of the indicator as seen when the liquid to be indicated is present therein:

Figure 4 is a diametrical sectional view taken approximately along the line 4—4 of Figure 3; and Figure 5 is a sectional view taken approximately along the line 5—5 of Figure 3.

Reference being had to the drawings, one illustrative embodiment of my liquid indicator is shown to comprise a generally cylindrical body member 10 having a passage 10b therethrough and means for securing portions of a tubing line 20 to the body member and in fluid conducting relationship to the passage. Centrally of the body member 10 is provided an enlarged portion 11 having a recess 12 communicating interiorly with passage 10b and opening exteriorly in portion 11. Means for viewing the recess are provided in the form of a transparent block 13 which is resiliently supported across the recess opening by securing means generally designated 14. Indicating means generally designated 15 are frictionally secured within recess 12 and are disposed so as to be viewable through the block 13. Thus, when liquid is present in the line 20, it enters through passage 10b, into recess 12 causing the indicating means 15 to automatically indicate its presence therein, such indication being readily viewable through the block 13.

The specific construction of the components comprising my liquid indicator will now be made clear. Body member 10 comprises a generally cylindrical member having oppositely disposed, exteriorly threaded ends 10a and 10a' which are adapted to receive the internally threaded portions of standard tubing coupling elements 20a. Such couplings for attaching the flared end of a tube to a male threaded member are well known in the art and require no further description herein. The body member ends 10a and 10a' are provided respectively with inwardly extending bores 10b' and 10b'' comprising portions of passage 10b. When tubing 20 is secured to the ends of the body member, fluid conducting relationship is had between the interior of the tubing and the bores.

Enlarged portion 11 provided centrally in body member 10 is provided with recess 12 with which the inner ends of bores 10b' and 10b'' communicate. Recess 12 is stepped somewhat inwardly of its outer opening 12a to form a shoulder 12b for carrying block 13. Spaced from and surrounding the outer opening 12a is an upstanding, annular rim 12c having a threaded outer portion 12c' and a cylindrical inner wall 12c''. At its outer end, rim 12c terminates in a radial surface 12c'''.

Transparent block 13 is partially received in recess 12 and projects outwardly from opening 12a radially inwardly of rim 12c. Block 13 may be formed of any suitable transparent material; in the embodiment now being described, it is formed of glass. Block 13 is disc shaped having a diameter only slightly less than the diameter of recess 12 at opening 12a. Between the inner face of block 13 and shoulder 12b of the recess is an annular washer 13a which acts to resiliently support the block 13 and provide a seal between the block 13 and the body member portion 11. Washer 13a may be of any suitable material, I have found, however, that an asbestos compound washer functions very satisfactorily for this purpose.

Securing means 14, provided for securing block 13 to the body member, comprises an annular compression nut 14a having an interiorly threaded portion 14a' and a radially inwardly extending flange 14a". In flange 14a" and adjacent portion 14a' is provided a groove 14a''' adapted to receive a gasket 14b in abutment with radial surface 12c''' of rim 12c. A compression ring 14c is provided to extend between flange 14a" of compression nut 14a, the outer surface of block 13 and the inner wall 12c" of rim 12c. Nut flange 14a" is provided with an angularly extending inner surface 14a'''' which acts to urge ring 14c toward wall 12c" and parallel thereto.

Compression ring 14c comprises an annular underturned metal spring cap 14c' and an annular resilient sleeve 14c". Spring cap 14c' is generally of U-shaped cross-section, having one leg bearing against the flange surface 14a'''' and the other leg bearing against the outer face of block 13; the cap is preferably formed of a resilient metal so that forcing action of the nut 14a will cause the spring cap 14c to yieldingly bear against the block 13. Sleeve 14c" extending between cap 14c' and rim 12c is forced into sealing contact with the inner wall 14c" by action of the cap 14c'. As sleeve 14c" further is pressed into the annular space between the block 13 and inner wall 12c", block 13 is further sealed to the body member 10. Thus a yielding securing of block 13 to body member 10 is effected by action of compression nut 14a against the compression ring 14c, which is controlled at its final limit by the gasket 14b, with opposing support being provided by resilient washer 13a. Such structure while being simple of construction effectively precludes the cracking of block 13 due to excessive pressures transmitted through the compression nut or by the expansion or contraction of the indicator body.

Indicating means 15 comprises a U-shaped channel or clip 15a having a base 15a', and upstanding spaced legs 15a" with slightly inturned free ends 15a'''. At opposite ends of the base 15a' are provided relatively sharp prongs 15b the lateral projection of which is slightly greater than the diameter of the recess 12. Clip 15a is preferably formed of a material having greater hardness than the material of which the body member 10 is made so that the prongs 15b will dig into the wall of the body member surrounding the recess 12 and securely hold the clip therein. One the inner surface of base 15a' is provided printed matter comprising a legend 15c. In the embodiment shown, and as best seen in Figure 3, legend 15c is in the form of the word "Full," any other suitable and desirable legend may, of course, be used.

A refracting means or lens 15d is arranged to be carried by the clip 15a and between the legend 15c and the block 13. The purpose of lens 15d is to distort the image of the legend 15c when viewed through the block 13 and when the liquid to be indicated is not present in the recess 12, so that the legend becomes illegible. While I show, for purposes of illustration, lens 15d to comprise a cylindrical glass rod having an outer curved surface 15d', it should be clear that any suitable transparent element having a non-planar, refracting outer surface, such as a ball or corrugated member, could be used. Lens 15d is formed of a material having a refractive index substantially the same as the refractive index of the liquid to be indicated. Thus, whereas the image of legend 15c is distorted so as to render it illegible when the liquid is not present in the recess 12 when the liquid is present the optical characteristics of the liquid-lens system are such as to eliminate the distortion causing the image of 15c to become legible.

As recess 12 provides a large area for the passage of the liquid therethrough, indicating means 15 does not substantially block the flow of the liquid therethrough, while yet being of a size allowing ready viewability of the legend 15c through the window formed by the block 13. Where liquids, as refrigerant fluids which are colorless and transparent, are to be conducted through the tubing, my indicator provides a simple and effective means for determining the presence of the liquid in the tubing line.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. A liquid indicator comprising: a body member having a liquid conducting passage therethrough and means for viewing the passage through one portion of the wall thereof, said body member further having an internal recess opposite said one portion and opening into said passage, said recess being provided with opposite side portions; and indicating means in said recess to be viewable through said viewing means, said indicating means including a U-shaped clip having a base with spaced legs upstanding therefrom, outwardly extending, sharp prongs on said base arranged to dig into said recess side portions to secure the clip fixedly to said body member, a legend on the surface of the base facing the viewing means when the clip is so secured in the recess, and a refracting means above the legend and clampedly held by said legs to have variable light refracting effect depending on the alternative presence and absence of liquid in the passage thereby to alter the appearance of the legend when viewed through the viewing means.

2. In a liquid indicator a tubular body member having an opening in the wall thereof; a resilient support surrounding the opening; a transparent block across said opening and supported on said resilient support; and means for sealingly securing said block to said body member comprising a nut threadedly secured to the body member and having an annular flange overlying the block and movable toward and away from the block, the surface of said flange facing generally toward said block being angularly disposed to face also laterally outwardly relative to the block, an annular yielding member extending longitudinally from said flange into abutment with said block arranged to be urged forcibly by said flange against said block to force the block tightly against the resilient support and the resilient support tightly against the body member, and an annular resilient element having a first portion extending between said body member and said block and a second portion extending between said yielding member and said body member, said second portion being yieldingly pressed by said yielding member into sealing engagement with said body member and said first portion being expanded into sealing engagement with said block as an incident of the pressing of said second portion by said yielding member.

3. A liquid indicator comprising: a body member having liquid conducting passage means therethrough and an opening through the wall thereof with a transparent window thereacross for viewing the passage means; and indicating means in said passage means to be viewable through said window, said indicating means including a lettered legend means in the passage means aligned with said window, and a refractive member in the passage means between said legend means and said window shaped to distort the letters of the legend to render them illegibly viewable when liquid is absent from the passage means, and having an index of refraction correlated with the index of refraction of the liquid to be indicated to render the letters legibly viewable to be readable at a glance when liquid is present in the passage means, the extent of said refractive member and said legend means transversely across said passage means being substantially less than the transverse cross-sectional area of the passage means at said window to permit free flow of liquid through the passage means.

4. A liquid indicator comprising: a body member having liquid conducting passage means therethrough and an opening through the wall thereof with a transparent window thereacross for viewing the passage means; and indicating means in said passage means to be viewable through said window, said indicating means including a lettered legend means in the passage means aligned with said window, and a refractive member in the passage means between said legend means and said window shaped to expand unidirectionally the letters of the legend to render them illegibly viewable when liquid is absent from the passage means, and having an index of refraction correlated with the index of refraction of the liquid to be indicated to render the letters legibly viewable when liquid is present in the passage means.

5. A liquid indicator comprising a body member having liquid conducing passage means therethrough and an opening through a wall thereof, a transparent window member across said opening for sight into the passage means, said transparent member having a planar outer surface, and indicating means viewable through said transparent window member and said passage means, said indicating means including a lettered legend means aligned with said transparent window member and refractive means defined by a curved surface disposed in the line of sight between said legend means and the planar surface of said transparent window means and exposed to said passage means to refract light rays from the letters of the legend to render them illegibly viewable when liquid is absent from the passage means, and having an index of refraction correlated with the index of refraction of the liquid to be indicated to render the letters legibly viewable when liquid is present in the passage means.

References Cited in the file of this patent

UNITED STATES PATENTS

| | | |
|---|---|---|
| 461,370 | Seidensticker | Oct. 13, 1891 |
| 2,594,113 | Askin | Apr. 22, 1952 |
| 2,655,124 | Gary | Oct. 13, 1953 |